United States Patent
Chen

(10) Patent No.: US 8,132,662 B1
(45) Date of Patent: Mar. 13, 2012

(54) CONVEYOR

(75) Inventor: Wen-Sheng Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/980,370

(22) Filed: Dec. 29, 2010

(30) Foreign Application Priority Data

Aug. 31, 2010 (CN) .......................... 2010 1 0268136

(51) Int. Cl.
*B65G 29/00* (2006.01)

(52) U.S. Cl. .................. 198/468.9; 198/750.1

(58) Field of Classification Search ............... 198/750.1, 198/750.11, 750.12, 468.01, 468.9; 414/749.1
See application file for complete search history.

(56) References Cited

U.S. PATENT DOCUMENTS

| | | | |
|---|---|---|---|
| 3,716,126 A * | 2/1973 | Perry et al. ................. | 198/464.4 |
| 5,011,001 A * | 4/1991 | Cameron ................... | 198/468.2 |
| 5,069,598 A * | 12/1991 | Kleinhen et al. ........... | 198/468.9 |
| 6,371,277 B1 * | 4/2002 | Malinie ....................... | 198/463.3 |
| 6,557,446 B2 * | 5/2003 | Carlberg et al. ........... | 198/468.9 |
| 6,662,934 B1 * | 12/2003 | Iida .............................. | 198/750.1 |
| 6,766,897 B2 * | 7/2004 | Kuwabara ................... | 198/750.1 |
| 6,899,218 B2 * | 5/2005 | Kwasniewicz et al. ..... | 198/750.7 |
| 6,899,511 B2 * | 5/2005 | Gurevich et al. ........... | 198/468.9 |

* cited by examiner

*Primary Examiner* — James R Bidwell
(74) *Attorney, Agent, or Firm* — Altis Law Group, Inc.

(57) ABSTRACT

A conveyor includes a support base, a linear driving mechanism mounted on the support base, a carrier, and a linkage bar mechanism pivotally connecting the carrier and the linear driving mechanism. The linear driving mechanism includes two substantially parallel threaded rods, two threaded members respectively engaging the two threaded rods, two actuators respectively rotating the two threaded rods, and two slide members slidable relative to the support base and respectively secured to the two threaded members. The linkage bar mechanism includes a first, second, and third bars pivotally connected to the slide member and the carrier, respectively. The first bar, the third bar, the slide member carrying the first bar, and the carrier cooperatively form a parallel four-bar mechanism. The first bar, the second bar, the slide member carrying the second bar, and the carrier cooperatively form a trapezoidal four-bar mechanism.

12 Claims, 3 Drawing Sheets

CONVEYOR

BACKGROUND

1. Technical Field

The present disclosure generally relates to conveyor technologies, and particularly to a conveyor employing a linkage bar mechanism.

2. Description of Related Art

A commonly used conveyor in a machining process includes a carrier to load and unload an article, a first driving mechanism to move the carrier in a first direction, and a second driving mechanism to move the carrier in a second direction. The first and second driving mechanisms employ a threaded-rod transmission or a gear-rack transmission, and an actuator to supply power. However, the conveyor has larger dimensions in both directions, thus requiring considerable space for operation.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
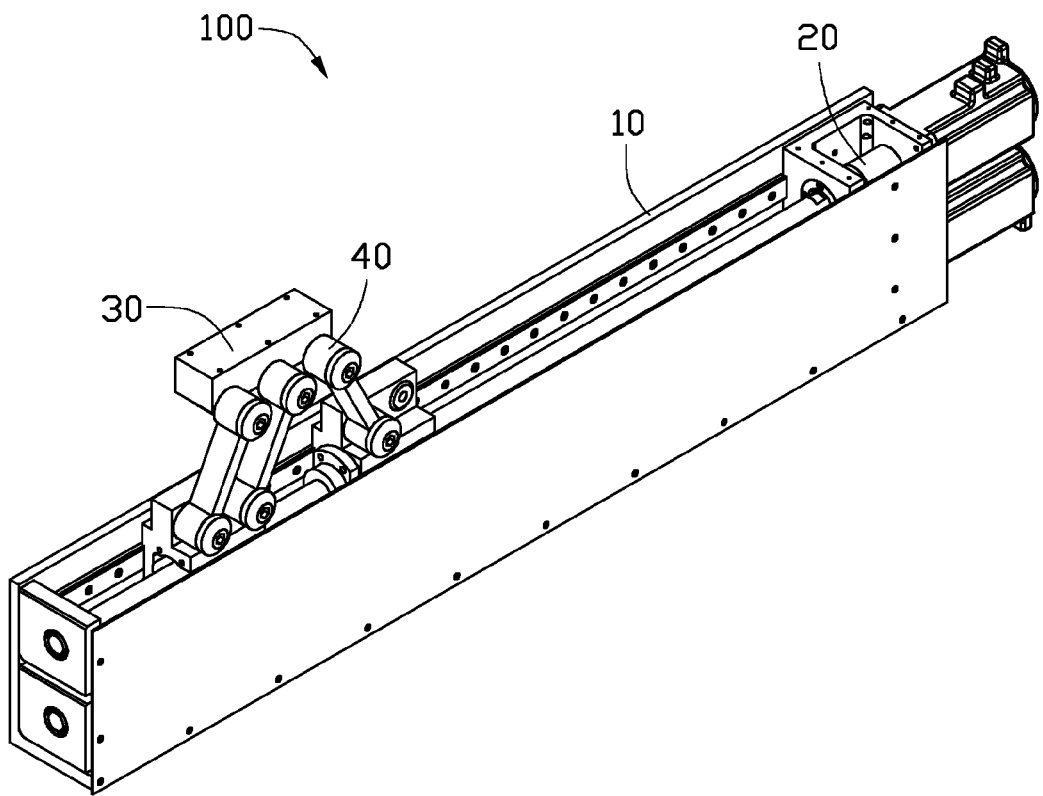
FIG. 1 is an assembled, isometric view of one embodiment of a conveyor including a side cover plate.

Referring to FIG. 1, one embodiment of a conveyor 100 includes a support base 10, a linear driving mechanism 20 mounted on the support base 10, a carrier 30 to load and unload articles, and a linkage bar mechanism 40 pivotally connecting the carrier 30 and the linear driving mechanism 20.

Figure 2:
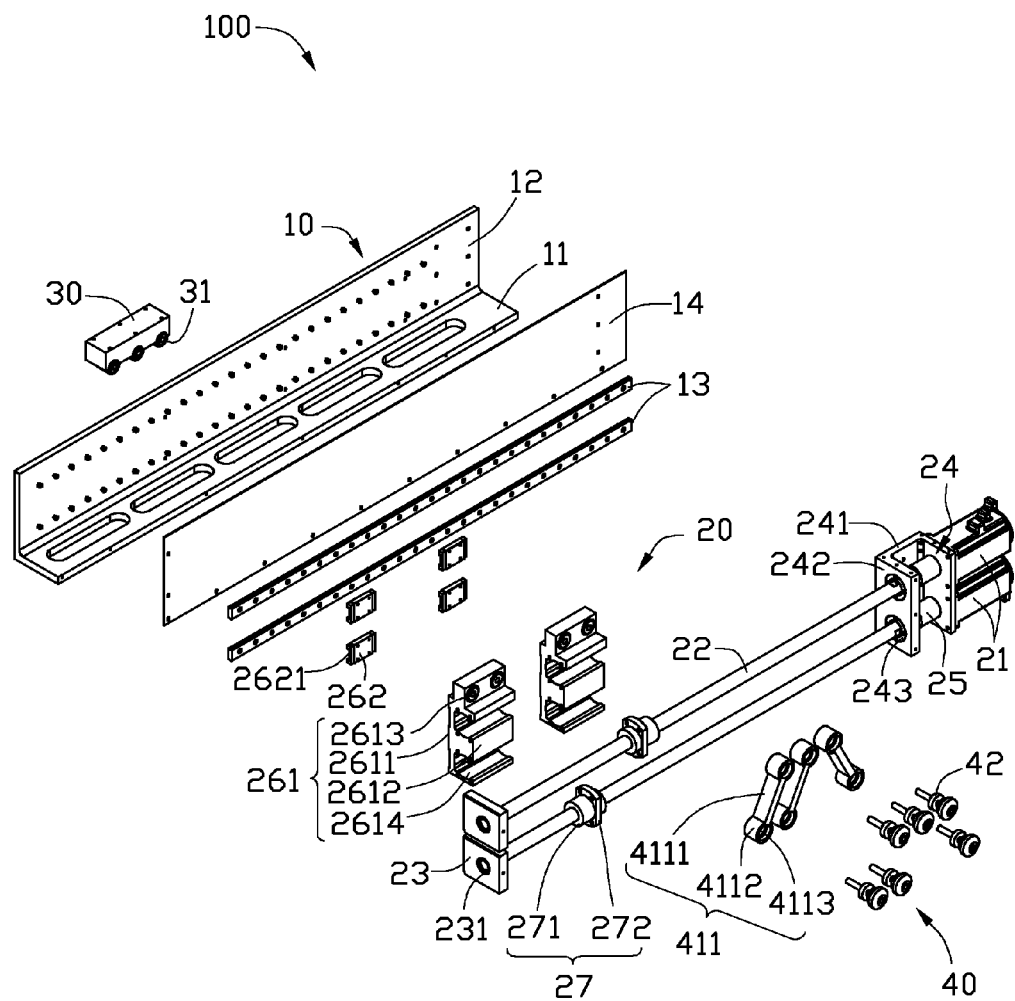
FIG. 2 is an exploded, isometric view of the conveyor of FIG. 1.
Figure 3:
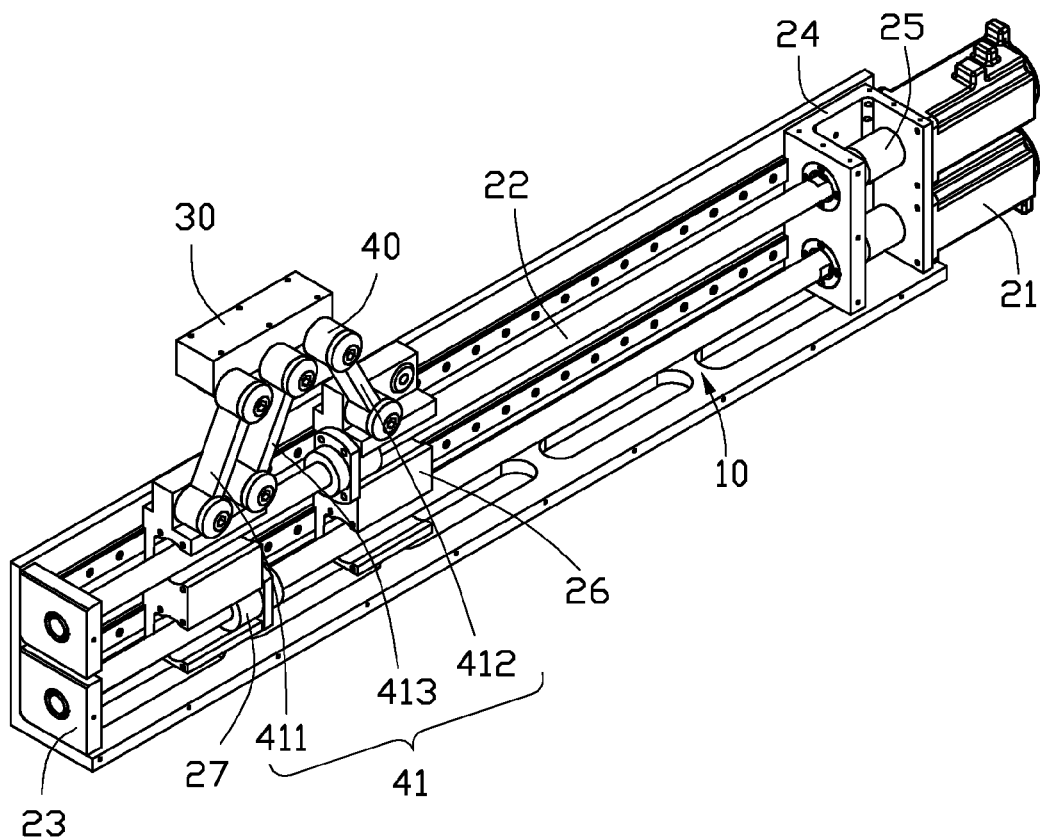
FIG. 3 is similar to the conveyor of FIG. 1, but shown without the side cover plate.

Referring also to FIGS. 2 and 3, the support base 10 includes a bottom plate 11, a support plate 12 substantially perpendicular to the bottom plate 11, two substantially parallel guide rails 13 secured onto a side surface of the support plate 12, and a side cover plate 14 positioned opposite to the support plate 12. In this illustrated embodiment, the support plate 12 and the bottom plate 11 are integrally formed and L-shaped. Each slide rail 13 extends linearly, and can be secured to the support plate 12 via a plurality of fasteners (not shown).

The linear driving mechanism 20 includes two actuators 21, two threaded rods 22, a first support member 23 and a second support member 24 respectively rotatably supporting opposite ends of the threaded rods 22, two clutches 25 respectively connecting the corresponding actuators 21 and threaded rods 22, two slide members 26 respectively rotatably mounted around the threaded rods 22, and two threaded members 27 respectively engaging the two threaded rods 22 and secured to the two slide members 26.

Each first support member 23 defines two shaft holes 231 in which the corresponding ends of the two threaded rods 22 are respectively received. Each second support member 24 is substantially U-shaped and includes a connecting wall 241 and two support walls 124 extending from opposite sides of the connecting wall 241. The connecting wall 241 is fixed to the support plate 12 of the support base 10 by one or more fasteners (not shown). Each support wall 242 defines two shaft holes 243 through which the two clutches 25 pass to connect the corresponding threaded rods 22 and actuators 21.

Each slide member 26 includes a main body 261 and two pairs of connecting members 262 respectively connected to the main body 261 and the two slide rails 13. The main body 261 includes a first side surface 2611, a second side surface 2612 opposite to the first side surface 2611, and a connecting portion 2613 positioned on an end of the main body 261. The second side surface 2612 defines two substantially parallel grooves 2614 to respectively receive the two threaded rods 22. The connecting portion 2613 is pivotally connected to the linkage bar mechanism 40. Each pair of connecting members 262 is secured to the first side surface 2611 of the main body 261. Each connecting member 262 defines a slide groove 2621 in which the corresponding slide rails 13 are slidably received. Each threaded rod 27 includes a main body 271 and a flange 272 formed on the main body 271. The main body 271 defines a threaded hole (not labeled) in which the corresponding threaded rod 22 engages. The flange 272 is fixed to one side surface of the slide member 26.

The carrier 30 defines three pivot holes 31 to mount the linkage bar mechanism 40. The linkage bar mechanism 40 includes a bar assembly 41 and a plurality of bearings 42. The bar assembly 41 includes a first bar 411, a second bar 412, and a third bar 413. The first bar 411 includes a bar portion 4111 and two connecting portions 4112 positioned on opposite ends of the bar portion 411. Each connecting portion 4112 is substantially cylindrical, and defines a bearing hole 4113 in which the corresponding bearing 42 is mounted.

The connecting portions 4112 of the first bar 411 are respectively pivotally connected to the corresponding slide member 26 and the carrier 30 via the bearings 42 received in the bearing holes 4113.

The second and third bars 412, 413 have the same structure as the first bar 411, and connect to the slide member 26 and the carrier 30 in the same manner. The first bar 411, the third bar 413, the slide member 26 carrying the first bar 411, and the carrier 30 cooperatively form a parallel four-bar mechanism. The first bar 411, the second bar 412, the slide member 26 carrying the second bar 412, and the carrier 30 cooperatively form a trapezoid four-bar mechanism.

In use, when the two actuators 21 are activated to respectively rotate the two threaded rods 22, the threaded members 27 engaging the threaded rods 22 are moved along the axis thereof with the slide members 26 being moved together, thus driving the bar assembly 41. The carrier 30 is moved thereby, in horizontal and/or longitudinal directions. As described in detail, when the two actuators 21 are rotated at the same speed, the first, second, and third bars 411, 412, 413 are relatively stationary with respect to each other. Thereby, the article on the carrier 30 is moved in the horizontal direction or the longitudinal direction. When the two actuators 21 are rotated at different speeds, the first and third bars 411, 412, and the second bar 412 have different movements in the horizontal direction or the longitudinal direction, thus the second bar 412 moves toward or away from the first and third bars 411, 413. Thereby, the carrier 30 is moved in the horizontal and longitudinal directions, and the articles can be elevated in the longitudinal direction. During the movement, the carrier 30 is moved with a translation movement and can be maintained in a predetermined posture. In addition, the conveyor 100 can be an elongated strip structure, and thus can be operated in a narrow space.

It is believed that the present embodiments and their advantages will be understood from the foregoing description, and it will be apparent that various changes may be made thereto without departing from the spirit and scope of the embodiments or sacrificing all of its material advantages.

The invention claimed is:

1. A conveyor comprising:
a support base;
a linear driving mechanism mounted on the support base, the linear driving mechanism comprising:
two substantially parallel threaded rods;
two threaded members respectively engaging with the two threaded rods;
two actuators respectively rotating the two threaded rods; and
two slide members slidable relative to the support base and respectively secured to the two threaded members;
a carrier; and
a linkage bar mechanism pivotally connecting the carrier and the linear driving mechanism, the linkage bar mechanism comprising a first bar, a second bar, and a third bar, wherein the first, second, and third bars are pivotally connected to the slide members and the carrier; the first bar, the third bar, the slide member carrying the first bar, and the carrier cooperatively form a parallel four-bar mechanism, and the first bar, the second bar, the slide member carrying the second bar, and the carrier cooperatively form a trapezoidal four-bar mechanism.

2. The conveyor of claim 1, wherein the support base comprises a bottom plate, a support plate substantially perpendicular to the bottom plate, and at least one guide rail secured onto the support plate; each slide member comprises at least one slide groove in which the at least one guide rail is slidably and engagably received.

3. The conveyor of claim 2, wherein the at least one guide rail comprises two substantially parallel guide rails.

4. The conveyor of claim 2, wherein the support base further comprises a side cover plate positioned opposite to the support plate.

5. The conveyor of claim 2, wherein the support plate and the bottom plate are integrally formed and L-shaped.

6. The conveyor of claim 1, wherein the linear driving mechanism further comprises two clutches respectively connecting the two threaded rods and the two actuators.

7. The conveyor of claim 6, wherein the linear driving mechanism further comprises a first support member and a second support member respectively rotatably supporting opposite ends of the two threaded rods.

8. The conveyor of claim 7, wherein the first support member defines two shaft holes in which the corresponding ends of the two threaded rods are respectively received.

9. The conveyor of claim 7, wherein each second support member comprises a connecting wall and two support walls extending from opposite sides of the connecting wall, the connecting wall is fixed to the support base, and each support wall defines two shaft holes through which the two clutches pass to connect the corresponding threaded rods and the actuators.

10. The conveyor of claim 2, wherein each slide member comprises a main body, and a connecting member connected to the main body, and the at least one guiding groove is formed on the connecting member.

11. The conveyor of claim 10, wherein the main body comprises a first side surface on which the connecting member is secured, a second side surface opposite to the first side surface and defining two substantially parallel grooves in which the two threaded rods are respectively received, and a connecting portion positioned on an end of the main body pivotally connected to the linkage bar assembly.

12. The conveyor of claim 1, wherein each threaded rod comprises a main body defining a threaded hole in which the corresponding threaded rod engages, and a flange formed on the main body and fixed to the slide member.

* * * * *